F. H. BRADSHAW.
DRAFT EQUALIZER.
APPLICATION FILED SEPT. 23, 1910.
1,044,738.
Patented Nov. 19, 1912.
2 SHEETS—SHEET 2.
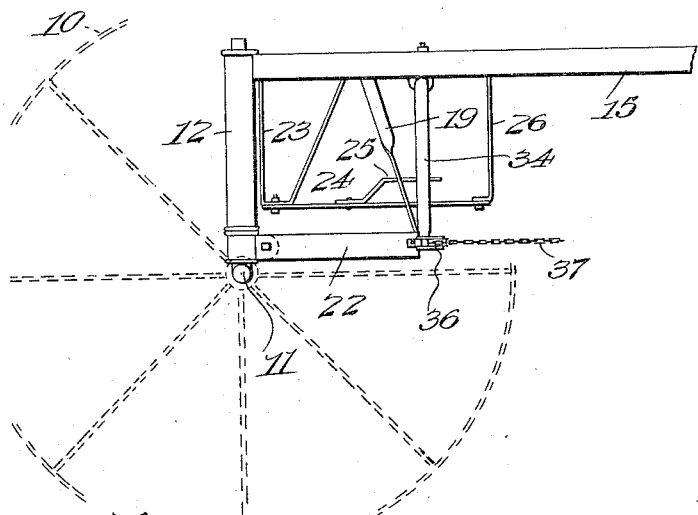
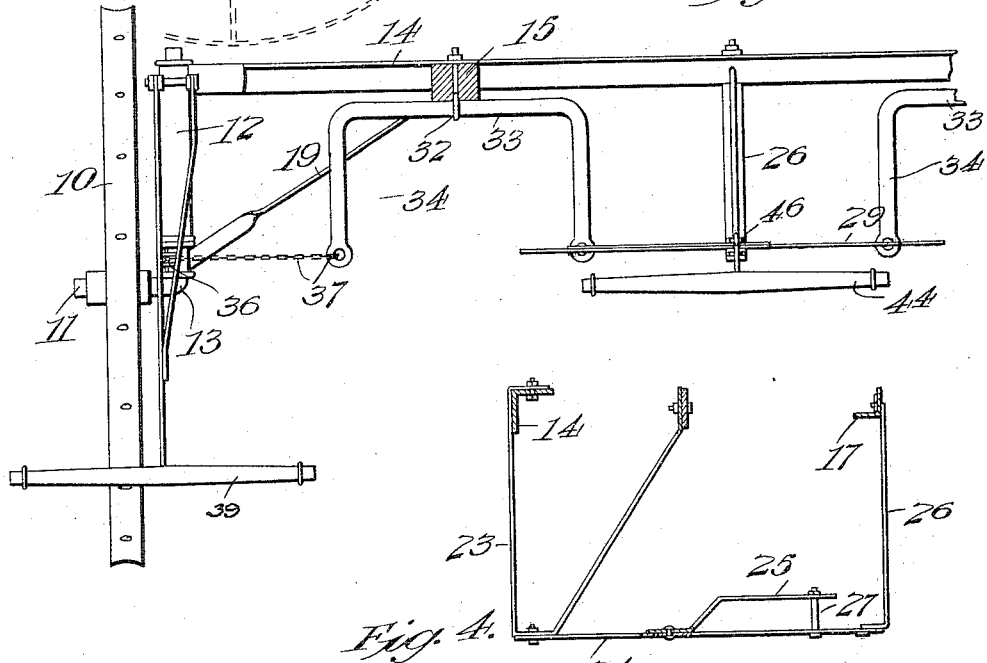
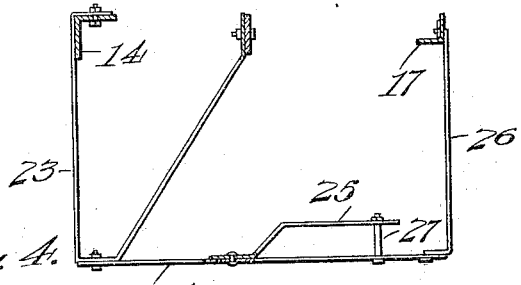
WITNESSES
INVENTOR
Fred H. Bradshaw
By Geo. S. Vashon
Attorney

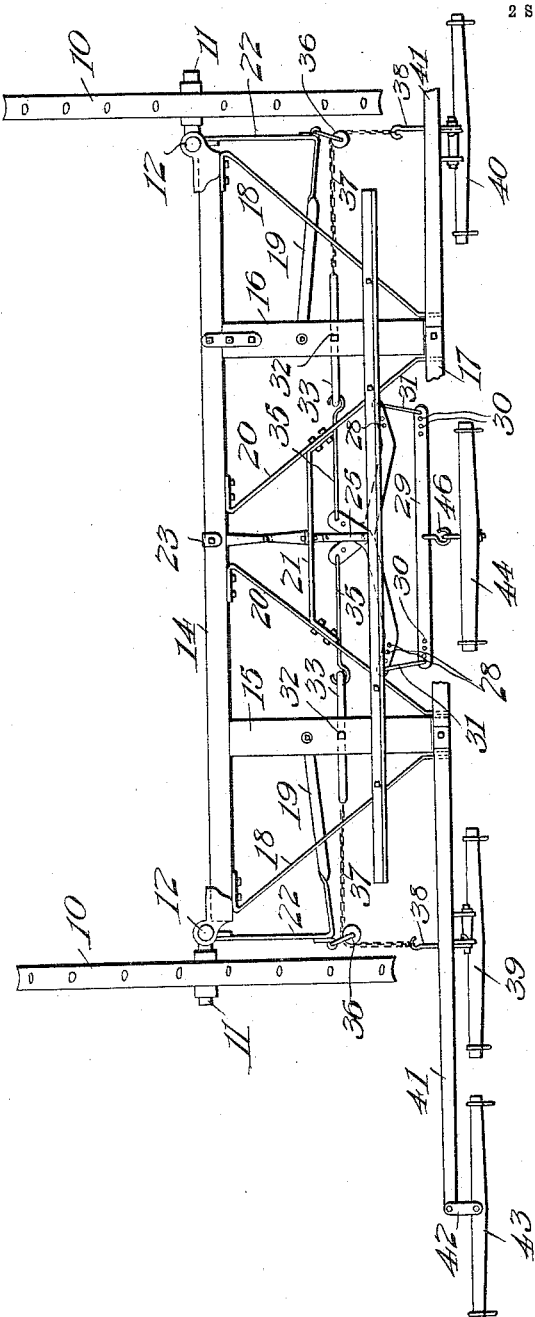

UNITED STATES PATENT OFFICE.

FRED H. BRADSHAW, OF CONWAY SPRINGS, KANSAS.

DRAFT-EQUALIZER.

1,044,738.

Specification of Letters Patent. Patented Nov. 19, 1912.

Application filed September 23, 1910. Serial No. 583,391.

*To all whom it may concern:*

Be it known that I, FRED H. BRADSHAW, a citizen of the United States, residing at Conway Springs, in the county of Sumner and State of Kansas, have invented new and useful Improvements in Draft-Equalizers, of which the following is a specification.

This invention relates to draft appliances and particularly to means for equalizing the draft of a number of animals hitched abreast or side by side, to any particular object, such, for instance, as very heavy wagons or agricultural implements, such as plows, cultivators, etc.

The primary object of the invention is to provide a novel draft equalizer which may be connected to an ordinary agricultural implement of the classes named, and especially to a plow or cultivator, and will so locate the draft animals with respect to plowed and unplowed ground as to permit the animals to work to best advantage.

A special object is to simplify and generally improve this type of devices, whereby the equalizer may be readily adjusted with respect to the number of animals to be used, and with respect to the implement in order that lateral strains may be entirely avoided.

In the accompanying drawings, in which I have shown one embodiment of my invention, Figure 1 represents a top plan view of my improved equalizer, arranged for any number of draft animals up to five, the draft bar being broken away at the right hand end and the swingletree at the right hand end omitted. Fig. 2 represents a view in side elevation of part of the construction shown in Fig. 1. Fig. 3 represents a view in front elevation of one-half of the apparatus, the other half being omitted. Fig. 4 represents a view partially in vertical section and partially in elevation.

Similar numerals refer to similar parts throughout the several figures of the drawings.

My invention residing in the draft equalization appliances, and such changed construction of ordinary implements as may be necessary to properly embody them therein, it will be readily understood that such appliances may be used on many forms of plows, cultivators, etc., of otherwise ordinary construction.

In the present instance, I will describe my invention, as applied to a gang cultivator which is sufficiently wide to carry a number of shares for cultivating several rows of plants, especially of corn, and only such parts of the cultivator will be referred to as are necessary to a perfect understanding of the construction and operation of the invention.

Referring particularly to the drawings, 10 indicates each of two wheels of any well known construction which are mounted upon axle-spindles 11 in the form of metal castings, secured upon the lower ends of uprights 12 of any suitable construction or material, the castings in this instance comprising the spindles 11 and sockets 13 to embrace and be secured, removably if desired, to the lower ends of the uprights, the spindles projecting laterally from the uprights, as most clearly shown in Fig. 3.

The uprights 12 are connected together by a transverse bar 14, in this instance shown as an angle bar of metal, and extending forwardly from this transverse bar 14 are longitudinal connecting beams 15 and 16, the beam 15 forming the tongue of the implement. The beams 15 and 16 are secured to and supported by a transverse beam 17 of any suitable material and construction, the transverse beams 14 and 17 and the longitudinal beams 15 and 16 forming an upper framework.

Suitable braces, such as 18, 19 and 20, connect and stiffen the several parts of the framework, the braces 18 extending rearwardly and downwardly, diagonally, from the transverse beams 15 and 16 to the lower ends of the uprights 12, while the braces 20 are secured at their rear ends to the transverse beam 14 and their forward ends to the framework at the junction of the front ends of the longitudinal beams 15 and 16 with the transverse beam 17, as clearly shown in Fig. 1. The braces 20 are stiffened and rigidly connected with each other by a transverse brace 21. Projecting forwardly from the uprights 12 are horizontal bars 22 which are rendered rigid by their connection with the beam 15 by means of the braces 19. Supported by a depending bar 23 and suitably braced, are horizontal bars 24, which, with bent bars 25 secured thereon, form clevises, the forward ends of the clevises being supported by depending arms 26. Resting upon the horizontal bar 24 are two bars which I shall hereafter term, for convenience of reference, the scissors bars, which cross each other and are mounted, scissors like, on an upright pintle 27, mounted in the bars 24 and 25 of the clevis, so that the scissors bar may turn readily thereon. The scissors bars are angular as clearly shown and their pivotal point is at their angles. The lateral arms of the scissors bars are provided with a series of holes 28 and the horizontal draw-bar 29 is similarly provided with a series of holes 30, the scissors bars and draw-bar being connected by links 31, by the adjustment of which in the different holes in the bars, the length of the bars and the leverage exerted by a pull on the draw-bar may be regulated.

At 32 are eye bolts depending from the longitudinal bars 15 and 16 in which are mounted with the capacity of sliding transversely therein, arches 33, the legs of which, as at 34, depend vertically to a point on a level with and in line transversely with the shorter ends of the scissors bars to which their lower ends are connected, respectively, by links 35.

At 36 are shown horizontal groove pulleys mounted upon vertical spindles, transversely and vertically in line with the lower ends of the depending legs of the arches. Around these pulleys are passed chains 37 which are connected with the lower ends of the depending legs 34 of the arches 33 and to hooks 38 to the forward ends of which are attached swingletrees 39 and 40.

A doubletree constituted by the transverse beam 17, with extensions 41, projecting laterally beyond the swingletrees 39 and 40 on each side, (that on the right hand side of Fig. 1 being broken away) carries at the outer end of each tree a link 42 to which is connected a swingletree 43, that on the right hand being omitted in Fig. 1.

By the use of any suitable means such as fastening means engaging the openings in the scissors bars said bars may be rigidly secured against movement on their pivots in which instance a single animal hitched to swingletree 44 connected by suitable links 46 with the draw-bar 29, will pull directly forward as though there were no draft equalizer appliances. With the scissors bars, however, free to move upon their pivots, the animal hitched to the swingletree 44 will exert a forward pull on the draw-bar, the power of which is regulated by the position of the connecting links 31, which pull would draw the longer arms of the scissors bar forward, and the shorter arms laterally toward each other in the center, this lateral pull being exerted with much greater power than the forward pull of the animal on account of the difference in applied leverage of the scissors bar. The draft horizontally and toward each other through the links 35 by means of the short arms of the scissors bars, will draw the arches 33 inwardly and will also draw the chains 37 with said arches, said chains passing around the pulleys 36 and drawing rearwardly on the hooks 38 and through them upon the swingletrees 39 and 40, the forward pull of the animal on the center swingletree 44 being equalized with that of both of the animals hitched to the swingletrees 39 and 40 in a manner well understood from the foregoing.

By the means described, the draft of the animals on the three swingletrees 39, 40 and 44 is equalized, to which draft may be added the direct draft of an animal hitched to the swingletree 43 at the left hand end of Fig. 1, and another animal to the swingletree at the right hand end of the double tree 41, omitted in Fig. 1.

By the means described, a pair of animals may be used hitched to the outer swingletrees, 43, a single animal hitched to the central swingletree 44, (with the scissors bars stationary), three animals hitched, respectively, to the swingletrees 39, 40 and 44, four animals hitched to the swingletrees 39, 40 and 43, with the scissors bars held stationary, or a pair of animals hitched to the swingletrees 39 and 40, with the scissors bars held stationary.

By adjusting the connecting links 31 nearer to the pivotal points of the arms of the scissors bars, or nearer to the center of the draft bar 29, or both, the amount of power exerted by the pull of the animal on the swingletree 44 can be regulated to a nicety, it being possible, with the connecting links in the holes nearest to the center of the draft bar and the pivots of the scissors bars to hitch a single animal to the swingletree and another to either of the swingletrees 39 or 40, the draft equalizing apparatus being permitted to operate, which of course would have no effect upon the swingletree 39 or 40, not occupied.

By using the arches 33 with the depending legs 34, a lower point is secured at which to place the swingletrees and to which to hitch the animals, which is advantageous in that it serves to prevent excessive rubbing of the collar upon the animals' necks sometimes occasioned by hitching at a higher level. The form of the arches leaves a clear space in that part of the implement which passes over adjacent rows of corn or other plants, so that the plants will not be crushed or mashed down by the passage of the cultivator. The situation of the swingletrees with relation to the arches and shares of the cultivator will be such as to permit the animals to travel on unplowed ground or in furrows and thus avoid traveling upon the furrow.

While I have specifically described the construction of the various parts of the implement in which my invention is embodied, it will be obvious to those skilled in the art that many changes and variations may be made in such specific construction without departing from the spirit and scope of the invention.

Having fully described my invention, what I claim as new and desire to secure by Letters Patent, is—

1. An apparatus of the character described, comprising a suitable framework, a pair of pivoted crossed levers, a draw-bar connected to the longer arms of said levers, a swingletree connected to the draw-bar, slidable connections between the shorter arms of said levers and said frame work, and a swingletree connected to each slidable connection.

2. An apparatus of the character described, comprising a suitable framework, a pair of pivoted crossed levers, a draw-bar connected to the longer arms of said scissors bars, and a swingletree connected to the draw-bar, arches mounted to slide laterally of said frame and provided with depending legs, a connection between one of said legs and one of the shorter arms of the levers, a swingletree, and a connection between the swingletree and the other depending leg of the arch.

3. An apparatus of the character described, comprising a suitable framework, a pair of pivoted crossed levers, a swingletree connected to the longer arms of said levers, a pair of arches mounted to slide laterally and having depending legs, the lower ends of which are laterally and vertically in line with the shorter arms of the levers, a connection between the shorter arm of each lever and the lower end of the adjacent depending leg of the arch, a swingletree adjacent to the outer leg of each arch and a connection between each of the two last named swingletrees and the lower end of the adjacent depending leg of the arch.

4. An apparatus of the character described, comprising a suitable framework, a pair of pivoted crossed levers, a swingletree connected to the longer arms of said levers, a pair of arches mounted to slide laterally and having depending legs, the lower ends of which are laterally and vertically in line with the shorter arms of the levers, a connection between the shorter arm of each lever and the lower end of the adjacent depending leg of the arch, a horizontal pulley mounted on a level with the lower end of the outer arm of each arch, a swingletree mounted in advance of said pulley and a chain passing around said pulley and connecting the swingletree with the lower end of the outer leg of the arch.

In testimony whereof, I affix my signature in presence of two witnesses.

FRED H. BRADSHAW.

Witnesses:
 JOHN G. BRADSHAW,
 GUS THOMAS.

Copies of this patent may be obtained for five cents each, by addressing the "Commissioner of Patents, Washington, D. C."